Patented Mar. 26, 1935

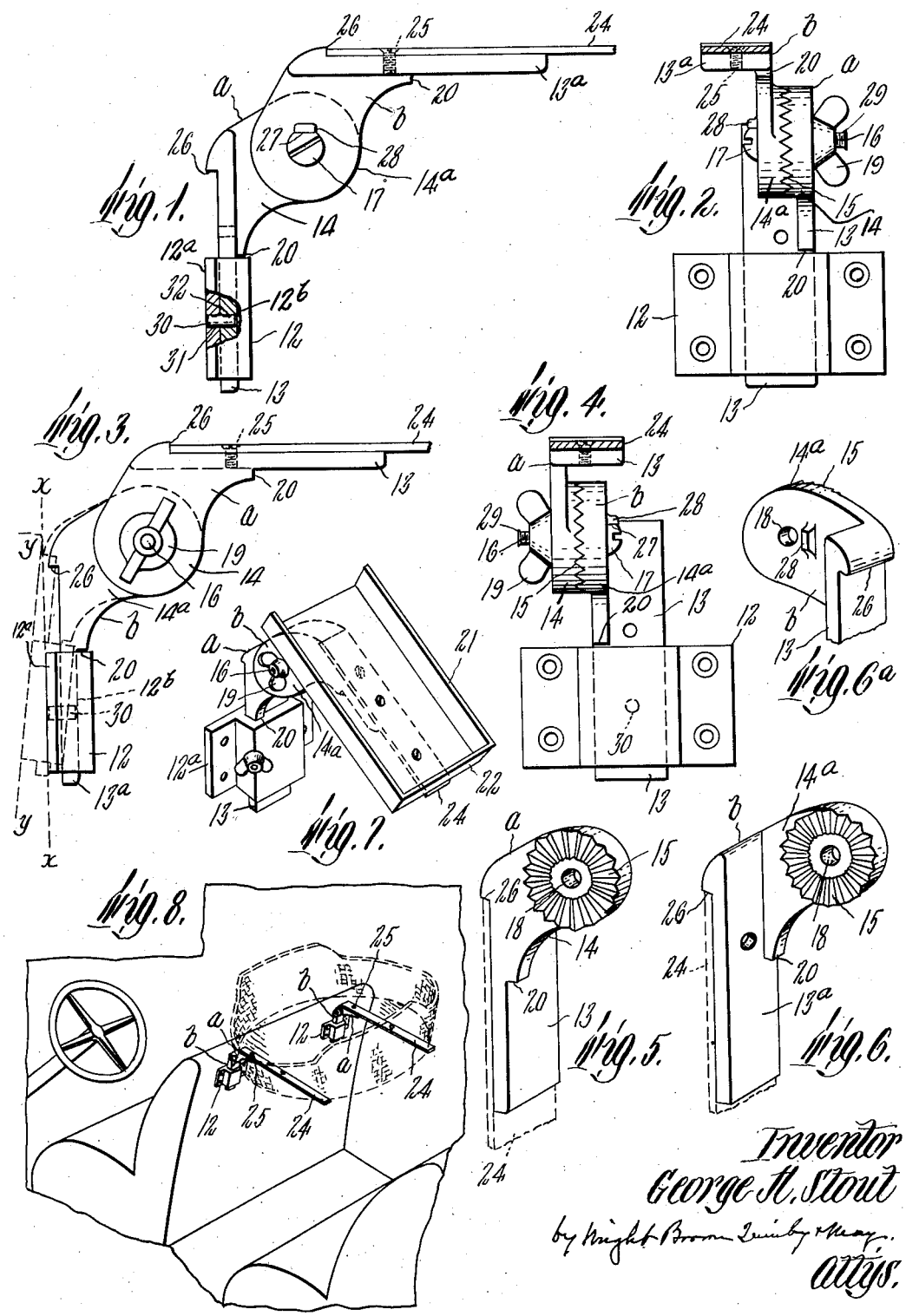

1,995,656

UNITED STATES PATENT OFFICE 1,995,656

ADJUSTABLE BRACKET

George H. Stout, Wakefield, Mass.

Application January 11, 1934, Serial No. 706,237

4 Claims. (Cl. 248—19)

The object of this invention is to provide an adjustable bracket of simple and durable construction adapted to be secured to a support which may be either inclined or vertical, and securely support an article either in a horizontal position or at various inclinations relative to the support.

The invention is embodied in the improvements hereinafter described and claimed.

Of the accompanying drawing forming a part of this specification,—

Figure 1 is a side view of my improved bracket showing one assembly of the elements thereof.

Figure 2 is an end view of the same assembly.

Figure 3 is a side view showing a different assembly.

Figure 4 is an end view of the assembly shown by Figure 3.

Figures 5 and 6 are perspective views of the two bracket members shown by the preceding figures.

Figure 6a shows in perspective another side of one of the members.

Figure 7 is a perspective view showing one use of the bracket.

Figure 8 is a perspective view showing two brackets each embodying the invention, said brackets being adapted to support an elongated article extending between them.

The same reference characters indicate the same parts in all of the figures.

My improved bracket includes a socket adapted to be attached to a support which may be either vertical or inclined, and two bracket members, one adapted to be held in a fixed position by the socket, and the other adjustable and pivotally connected to the fixed member and adapted to be adjusted so that it may project either horizontally from the fixed member, or be inclined relative thereto, said members being provided with interlocking clutch teeth whereby the adjustable member may be locked in different positions to the fixed member. The preferred construction is such that either member may be the fixed member, and the other the adjustable member.

I will first describe the bracket as shown by Figures 1, 2 and 7.

The socket designated as a whole by 12, has a closed back, 12a (Figure 1), formed to bear on a supporting surface, which may be the back of an automobile seat and inclined as shown by the dotted line y—y, or vertical as indicated by the dotted line x—x (see Figure 3). The socket is provided with means such as ears flush with the back and provided with screw holes whereby it may be attached to the support, and with a pocket 12b (Figure 1), extending from its upper to its lower end and closed at its inner side by the back 12a.

The two bracket members above mentioned are designated respectively by a and b. In the arrangement shown by Figures 1 and 2 the member a is the fixed member and the member b the adjustable member.

Said fixed member includes a shank 13 formed to enter the pocket 12b and an ear 14 projecting outward from the shank and located above the pocket, means such as a stop shoulder 20 being provided for limiting the entrance of the shank into the pocket.

The ear of the fixed member is provided with a bolt receiving orifice 18 (Figure 5), and a series of clutch teeth 15 surrounding the orifice.

The bracket member b constituting the adjustable member includes an ear 14a having another bolt receiving orifice 18 and another series of clutch teeth 15 surrounding the orifice and formed to engage the teeth 15 of the fixed bracket member, a shank 13a projecting from said ear, and an article supporting extension 24 secured to and projecting from the shank 13a.

For clamping the ears of the two members together and maintaining their clutch teeth interlocked, I provide a threaded bolt 16 insertable in the two ear orifices 18 and having a head 17 bearing on the outer side of one ear and a clamping nut 19 engaged with the bolt thread and bearing on the outer side of the other ear.

The bolt pivotally connects the ears, and its axis is parallel with the socket back 12a, so that when said back bears on either an inclined or a vertical support, the shank and extension of the adjustable member may be adjusted and confined by the clamping means in either a horizontal position as shown by Figure 1, or an inclined position, as shown by Figure 7.

The ears 14 and 14a have opposite side faces arranged in planes at right angles with the socket back 12a. The clutch teeth are on the meeting inner sides of the ears and the outer sides of the ears are flat.

The flat side of the ear 14a has an outwardly projecting lug 28, and the head 17 of the clamping bolt has a flat peripheral face arranged to bear on the lug, as shown by Figures 1 and 2.

The threaded portion of the bolt projects from the flat side of one of the ears so that the nut is freely rotatable on the bolt to cause the nonrotating bolt to exert clamping pressure on the ears.

The bolt is elongated to cause the projection of its threaded end from the nut. Said threaded end is upset to form a fin 29 constituting a stop which is spaced from the nut when the latter is in clamping position, said stop permitting clamping and releasing adjustments of the nut and preventing separation of the nut from the bolt.

To prevent the removal of the two bracket members from the socket when the latter is attached to a support, I provide the socket back 12ª with an orifice 30 and the shank of the fixed bracket member with an orifice 32 which coincides with the orifice 30 when the entrance of the fixed member shank into the pocket is limited by the stop shoulder 20. Before the attachment of the socket to the support a dowel 31 is driven into the orifices 30 and 32. When the socket is attached to the support the dowel cannot be removed.

When the bracket members are arranged as shown by Figures 3 and 4, the member b is the fixed member, and the member a is the adjustable member, the function of the bracket being the same as already described.

The extension 24 of the adjustable member is preferably a strip of metal having an inner end abutting a shoulder 26 on the shank of the adjustable member, and confined against said shoulder by a screw 25, the extension being prevented by the shoulder 26 from swinging on the screw 25.

It will now be seen that the extension 24 may be fixed in a horizontal position and cooperate with the extension 24 of a similar bracket in supporting an article such as a basinette or a dog basket, as indicated by Figure 8. Said extensions may be resilient to yieldingly support said article. It will also be seen that the extension 24 may be fixed in an inclined position, and used to support an article 21, as indicated by Figure 7. Said article may be a tray adapted to support a telephone directory in an inclined position, and having a retaining curb 22 which is open at one end, the socket being attached to a vertical wall.

When the parts are assembled as shown by Figures 1 and 2, the clamping nut 19 bears on the flat side of the ear of the fixed bracket member opposite the side having the lug 28, and when said parts are assembled, as shown by Figures 3 and 4, the nut bears on the flat side of the adjustable bracket member ear opposite the side having the lug 28. The nut may therefore be located on the side of the bracket which is the more conveniently accessible.

The shank 13 projects from one side of the ear 14, and the shank 13ª projects from the opposite side of the ear 14ª. When the parts are assembled as shown by Figures 1, 2 and 7, the flat side of the ear 14 on which the nut bears is exposed at one side of the bracket as best shown by Figure 2, and when they are assembled as shown by Figures 3 and 4, the flat side of the ear on which the nut bears is exposed at the opposite side of the bracket, as best shown by Figure 4. In each case the nut bears on a flat side of an ear which is not overhung by a shank, so that the nut may be conveniently manipulated, as will be seen by an inspection of Figures 2 and 4.

I claim:

1. A bracket comprising in combination, a socket having a back formed to bear on and be attached to a support and provided with a shank receiving pocket; a fixed bracket member including a shank formed to enter said pocket and an ear projecting from the shank and having a bolt receiving orifice and clutch teeth; an adjustable bracket member including an ear having a bolt receiving orifice, clutch teeth, and a shank; an article supporting extension secured to and projecting from the adjustable member shank; and means for clamping the bracket member ears together, and maintaining their clutch teeth interlocked, said means including a threaded bolt inserted in the ear orifices and having a head bearing on one ear, and a clamping nut engaged with the bolt and bearing on the other ear, the axis of the bolt being parallel with the socket back, so that when the socket bears on either an inclined or a vertical support, the shank and extension of the adjustable member may be adjusted and confined by the clamping means in either a horizontal or an inclined position.

2. A bracket as specified by claim 1, the ear of one of said bracket members having an outwardly projecting lug, the clamping bolt head having a peripheral face arranged to bear on said lug and prevent rotation of the bolt by the nut.

3. A bracket as specified by claim 1, the threaded end of the bolt being provided with a stop spaced from the nut when the latter is in clamping position, said stop permitting clamping and releasing adjustments of the nut and preventing separation of the nut from the bolt.

4. A bracket as specified by claim 1, the pocket of said socket having a closed back containing an orifice, and the shank of the fixed bracket member containing an orifice coinciding with the pocket back orifice and covered by the outer wall of the pocket, said shank being locked in the pocket by a dowel driven into said orifices and confined against removal therefrom by the surface to which the socket is attached and by the outer side of the pocket.

GEORGE H. STOUT.